(12) United States Patent
Caliendo et al.

(10) Patent No.: US 11,746,731 B2
(45) Date of Patent: Sep. 5, 2023

(54) RADIAL AIR CLEANER

(71) Applicant: Caterpillar Inc., Peoria, IL (US)

(72) Inventors: Vincent P. Caliendo, Dunlap, IL (US);
Cooper Melvin, Streator, IL (US);
Nathan Whitman, Eureka, IL (US);
Chelsea Ocampo, Waukegan, IL (US);
Jeffrey Ledford, Pontiac, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/464,515

(22) Filed: Sep. 1, 2021

(65) Prior Publication Data
US 2023/0063222 A1 Mar. 2, 2023

(51) Int. Cl.
| | | |
|---|---|---|
| *F02M 35/024* | (2006.01) | |
| *B01D 50/20* | (2022.01) | |
| *B01D 45/16* | (2006.01) | |
| *B01D 46/24* | (2006.01) | |
| *B01D 46/52* | (2006.01) | |
| *F02M 35/02* | (2006.01) | |

(52) U.S. Cl.
CPC ....... *F02M 35/02483* (2013.01); *B01D 45/16* (2013.01); *B01D 46/24* (2013.01); *B01D 46/521* (2013.01); *B01D 50/20* (2022.01); *F02M 35/0201* (2013.01); *F02M 35/02416* (2013.01); *B01D 2279/60* (2013.01)

(58) Field of Classification Search
CPC ......... F02M 35/02483; F02M 35/0201; F02M 35/02416; B01D 45/16; B01D 46/24; B01D 46/521; B01D 50/20; B01D 2279/60
See application file for complete search history.

(56) References Cited

U.S. PATENT DOCUMENTS

| | | | | |
|---|---|---|---|---|
| 4,491,460 | A | * | 1/1985 | Tokar ..................... B01D 46/48 55/508 |
| 5,800,581 | A | * | 9/1998 | Gielink .................. B01D 46/88 55/498 |
| 9,346,001 | B2 | | 5/2016 | Kato et al. |
| 10,835,850 | B2 | | 11/2020 | Osendorf et al. |
| 2003/0159414 | A1 | | 8/2003 | Cheng et al. |
| 2016/0097354 | A1 | * | 4/2016 | Martus ............... F01M 13/0011 123/572 |

FOREIGN PATENT DOCUMENTS

| | | |
|---|---|---|
| CN | 202832876 U | 3/2013 |
| CN | 103452712 B | 3/2017 |

(Continued)

*Primary Examiner* — Jacob M Amick
*Assistant Examiner* — Charles J Brauch

(57) ABSTRACT

An air cleaner for an internal combustion engine is disclosed. The air cleaner may include a housing defining an interior and having a first end and a second end opposite the first end. The housing may include an air inlet configured to be fluidly coupled to an air intake of the internal combustion engine and an air outlet configured to be fluidly coupled to a compressor of the internal combustion engine. The housing may include a general cylindrical shaped section extending from the first end and an inverse taper section located distally from the generally cylindrical shaped section and extending towards the second end. A diameter of the inverse taper section may increase from a first end towards the second end.

20 Claims, 4 Drawing Sheets

(56) References Cited

FOREIGN PATENT DOCUMENTS

| | | |
|---|---|---|
| DE | 202010018248 U1 | 4/2015 |
| DE | 10 2020 103 382 A1 | 3/2020 |
| KR | 20070023040 A | 2/2007 |
| WO | 2006045138 | 5/2006 |
| WO | 2017066169 | 4/2017 |
| WO | 2020/086322 A1 | 4/2020 |

\* cited by examiner

US 11,746,731 B2

RADIAL AIR CLEANER

TECHNICAL FIELD

The present disclosure relates generally to radial air cleaners, and more particularly, to an improved radial air cleaner.

BACKGROUND

Radial air cleaners may be used in internal combustion engines to filter out particulates, such as dust, from intake air coming into the engine. Such radial air cleaners may include a filter in which the intake air is passed through to filter the particulates from the intake air. Some radial air cleaners include two stages, such that some of the particulates may be deposited out of the air cleaner (e.g., through an exhaust port) prior to the intake air being passed through the filter. The particulate separation efficiency of such two-stage radial air cleaners may be limited by current inlet designs and nearly straight air cleaner housings. For example, velocity of the intake air (e.g., and thus centrifugal force for forcing the particulates through the exhaust port) through the housing of the radial air cleaner may be limited, and thus particulates in the intake air may not be sufficiently separated during the first stage (e.g., the depositing stage) prior to being passed through the filter. Accordingly, current radial air cleaners may provide for inadequate separation of particulates from the intake air.

One such radial air cleaner is disclosed in U.S. Pat. No. 4,491,460 ("the '460 patent") to Tokar, issued on Jan. 1, 1985. The '460 patent discloses an air cleaner having an intake tube that has a deflecting surface. The deflecting surface causes an air flow to have an axial and downward trajectory which produces a helical air flow resulting in centrifugal separation of heavy particulate matter. However, the air cleaner of the '460 may not adequately and efficiently separate particulates from the intake air.

The disclosed radial air cleaner may solve one or more of the problems set forth above and/or other problems in the art. The scope of the current disclosure, however, is defined by the attached claims, and not by the ability to solve any specific problem.

SUMMARY

In one aspect, an air cleaner for an internal combustion engine is disclosed. The air cleaner may include a housing defining an interior and having a first end and a second end opposite the first end. The housing may include: an air inlet configured to be fluidly coupled to an air intake of the internal combustion engine; an air outlet configured to be fluidly coupled to a compressor of the internal combustion engine; a general cylindrical shaped section extending from the first end; and an inverse taper section located distally from the generally cylindrical shaped section and extending towards the second end, wherein a diameter of the inverse taper section increases from a first end towards the second end.

In another aspect, an air cleaner for an internal combustion engine is disclosed. The air cleaner may include a housing defining an interior and having a first end and a second end opposite the first end. The housing may include: an air inlet configured to be fluidly coupled to an air intake of the internal combustion engine; and an air outlet configured to be fluidly coupled to a compressor of the internal combustion engine; a filter support member located in the interior of the housing at the first end, the filter support member configured to support a filter and defining a generally cylindrical shape; and an inlet vane extending around a portion of a circumference of the filter support member, the inlet vane extending from the first end of the housing towards the second end.

In yet another aspect, an air cleaner for an internal combustion engine is disclosed. The air cleaner may include a housing defining an interior and having a first end and a second end opposite the first end. The housing may include: an air inlet configured to be fluidly coupled to an air intake of the internal combustion engine; an air outlet configured to be fluidly coupled to a compressor of the internal combustion engine; a general cylindrical shaped section extending from the first end; an inverse taper section located distally from the generally cylindrical shaped section and extending towards the second end, wherein a diameter of the inverse taper section increases from a first end towards the second end; a filter support member located in the interior of the housing at the first end, the filter support member configured to support a filter and defining a generally cylindrical shape; and an inlet vane extending in a helical shape around a portion of a circumference of the filter support member, the inlet vane extending from the first end of the housing towards the second end.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
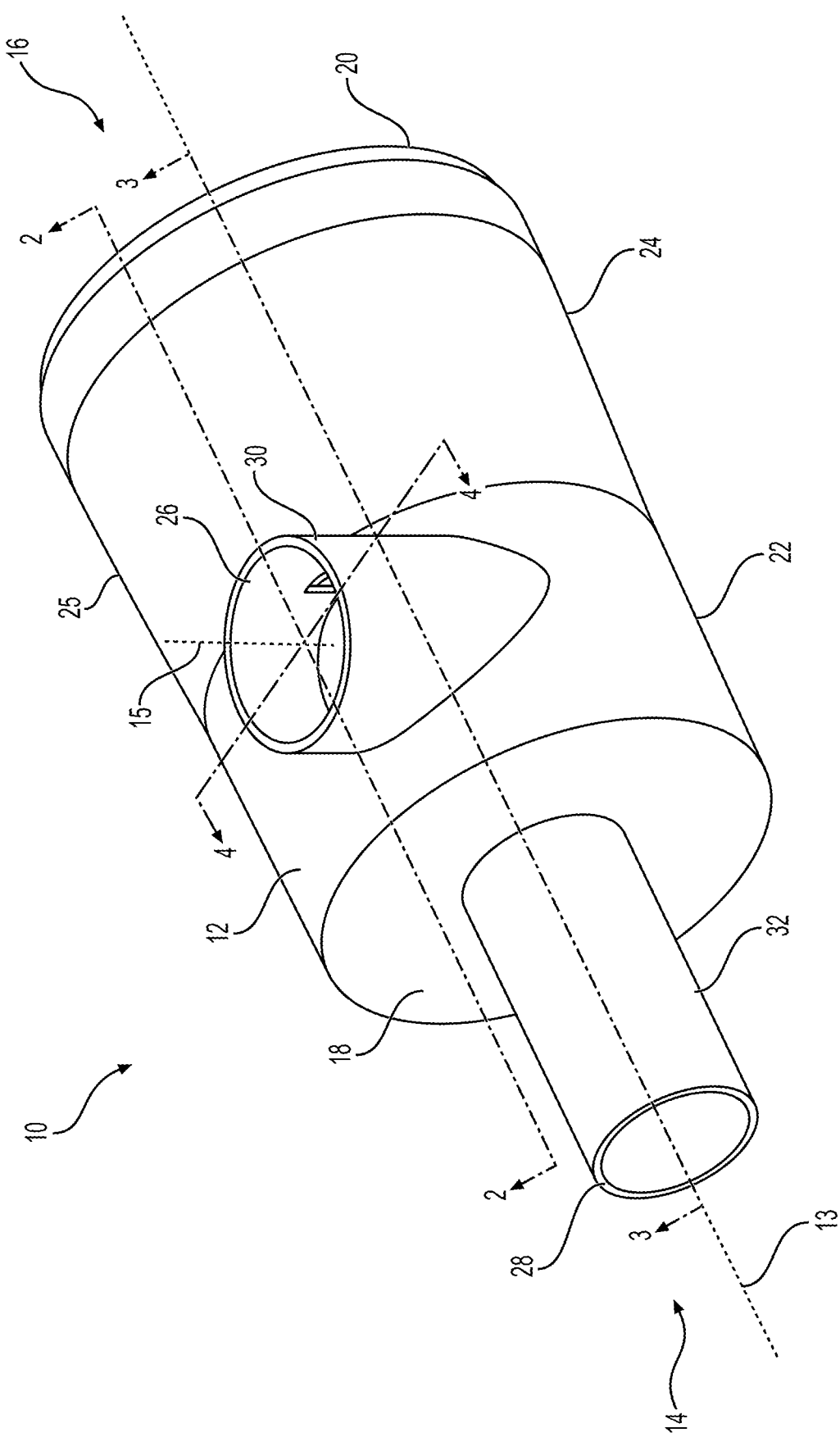
FIG. 1 is a right side perspective view of an exemplary radial air cleaner, according to aspects of the present disclosure.

FIG. 1 illustrates a right side perspective view of an exemplary radial air cleaner 10, according to one or more embodiments. Radial air cleaner 10 includes a housing 12 extending along a central longitudinal axis 13 and defining a hollow interior of radial air cleaner 10. Housing 12 includes a first, proximal, end 14 and a second, distal, end 16 opposite the first end 14. First end 14 is defined by a first end wall 18 thereon. First end wall 18 is typically not removable from housing 12, and in some instance it may be formed integral with housing 12. However, it is understood that first end wall 18 may be removable if desired. Second end 16 of housing 12 is defined by a second end wall 20 thereon. Second end 16 may include an open end over which second end wall 20 is mounted. For example, second end wall 20 may include a removable cover or the like for providing access to the interior of housing 12. Housing 12 may include a first portion 22 and a second portion 24. First portion 22 of housing 12 may include a generally cylindrical shape. In some embodiments portion 22 of housing 12 may include a minimal taper (e.g., less than 2 degrees) being less than an inverse taper 25, described below. Accordingly, a "generally cylindrical shape" may include a cylindrical shape having a substantially straight outer edge and/or a cylindrical shape having a minimally tapered outer edge. A length of first portion 22 of housing 12 along central longitudinal axis 13 may be in a range of 205-215 mm.

Second portion 24 of housing 12 may include an inverse taper 25 such that a diameter of housing 12 increases from the first portion 22 to the second portion 24, as detailed further below. A length of second portion 24 of housing 12 along the central longitudinal axis 13 may be in a range of 230-245 mm. Housing 12 may include an overall length in a range of 435-460 mm. A diameter of the first portion 22 of housing 12 may be in range of 335-345 mm. A diameter of the second portion 24 (e.g., inverse taper 25) of housing 12 may expand at one end from a range of 335-345 mm and may inversely taper (e.g., expand) towards the second end 16 such that a diameter at or near the second end 16 may be in a range of 340-350 mm. Thus, the diameter of second portion 24 may increase along the length of second portion 24. It is understood that housing 12 may include any size and/or general shape, as desired. Housing 12 may include any material known in the art, such as a plastic, a composite, a metal, or the like.

Housing 12 may also include an air inlet 26 and an air outlet 28. Air inlet 26 includes an aperture or port extending through housing 12 for providing air flow communication with an interior of housing 12. Air inlet 26 may include an inner diameter in a range of 130-150 mm. Housing 12 may include an inlet tube 30 affixed thereto that defines air inlet 26. Inlet tube 30, and thus air inlet 26, may include a central longitudinal axis 15 that is offset (e.g., tangential) and substantially perpendicular, or orthogonal, to the central longitudinal axis 13 of housing 12. Inlet tube 30 may be fluidly coupled to an intake (not shown) of an internal combustion engine (not shown) such that intake air may pass through air inlet 26 into the interior of housing 12, as detailed further below. Air outlet 28 may include an aperture or port extending through first end wall 18 of housing 12. Air outlet 28 may include an inner diameter in a range of 105-125 mm. Housing 12 may include an outlet tube 32 affixed thereto that defines air outlet 28. Accordingly, outlet tube 32 may extend from first end wall 18 of housing 12. Outlet tube 32, and thus air outlet 28, may include a central longitudinal axis that is substantially aligned with the central longitudinal axis 13 of housing 12. Thus, outlet tube 32 may extend in a substantially same direction as housing 12. Outlet tube 32 may be in fluid communication with a compressor (not shown) of a turbocharger (not shown) of the internal combustion engine such that air may exit the interior of housing 12 through air outlet 28, as detailed further below. While the exemplary embodiment depicts inlet tube 30 and outlet tube 32 as having generally cylindrical shapes, it is understood that inlet tube 30 and outlet tube 32, and thus air inlet 26 and air outlet 28, may include any shape as desired. Further, air inlet 26, inlet tube 30, air outlet 28, and outlet tube 32 may include any size as desired.

Figure 2:
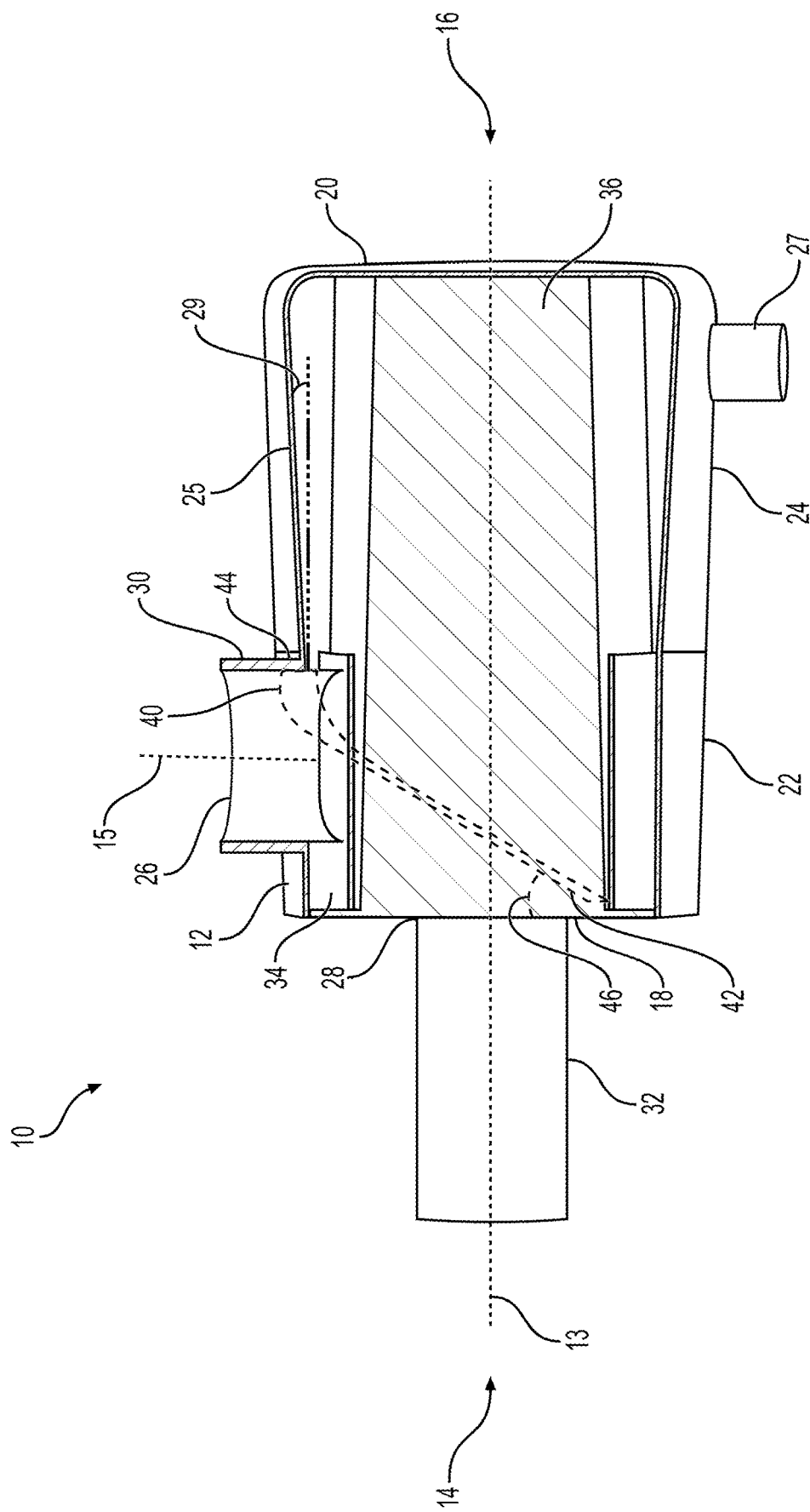
FIG. 2 is a right side view along line 2-2 of the radial air cleaner of FIG. 1.
Figure 3:
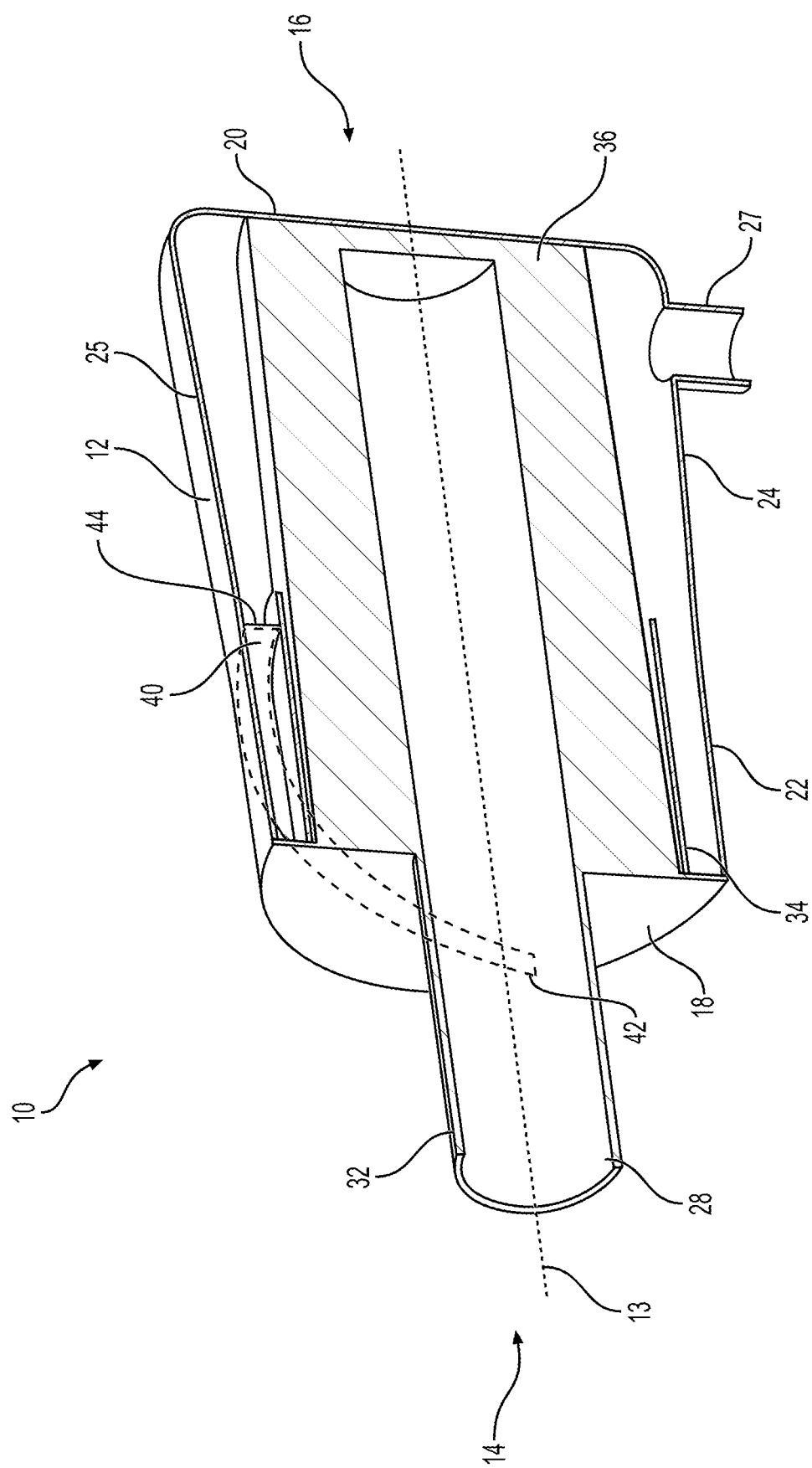
FIG. 3 is a perspective right side view along line 3-3 of the radial air cleaner of FIG. 1.
Figure 4:
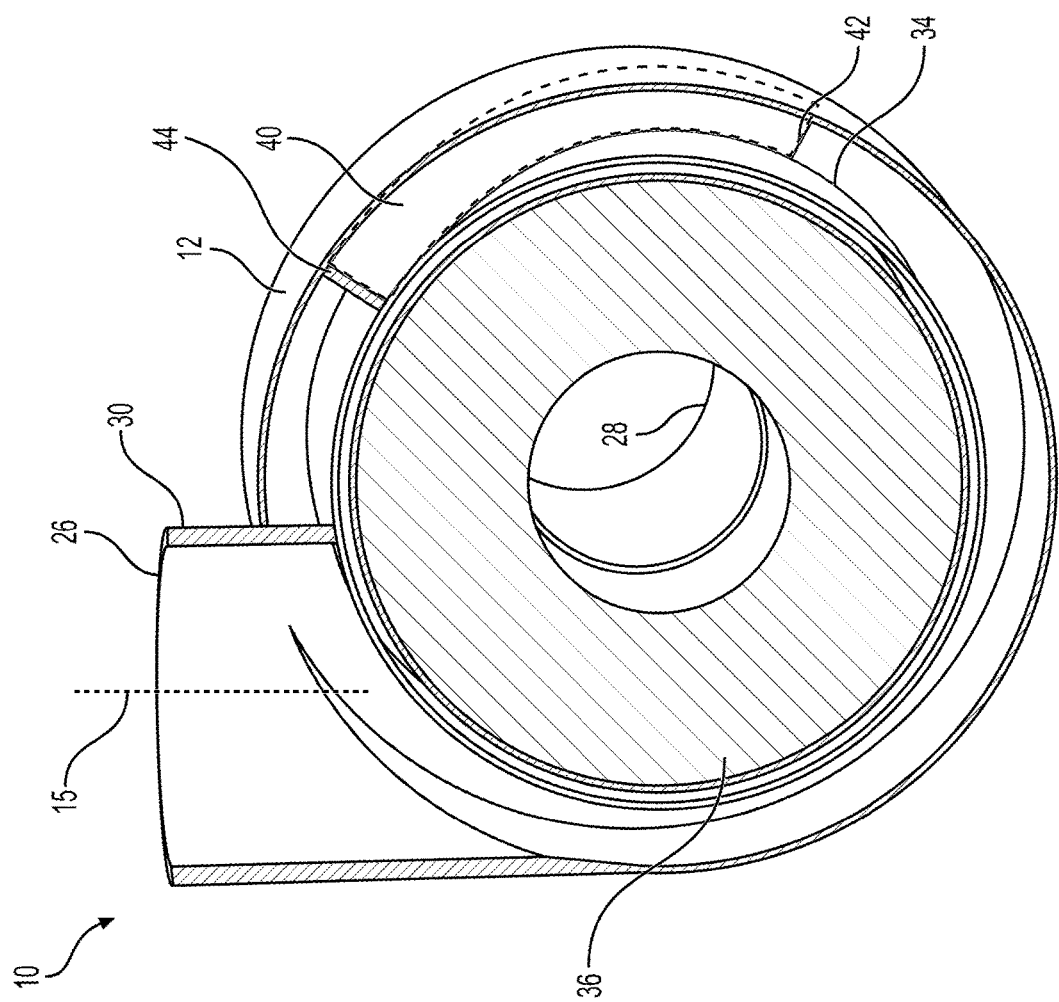
FIG. 4 is an end view along line 4-4 of the radial air cleaner of FIG. 1.

FIG. 2 illustrates cross sectional side view along line 2-2 of FIG. 1. For illustration purposes, line 2-2 is through a center of inlet tube 30, parallel with central longitudinal axis 13 of housing 12, and is substantially perpendicular to central longitudinal axis 15 of air inlet 26. FIG. 3 illustrates a cross sectional side perspective view along line 3-3 of FIG. 1. For illustration purposes, line 3-3 is through a center of housing 12, along central longitudinal axis 13 of housing 12. Thus, inlet tube 30, and air inlet 26, are not shown in FIG. 3 due to air inlet 26 being offset from central longitudinal axis 13 of housing 12. FIG. 4 illustrates a cross sectional end view along line 4-4 of FIG. 1. For illustration purposes, line 4-4 is through a center of inlet tube 30 and is perpendicular to both central longitudinal axis 13 of housing 12 and central longitudinal axis 15 of air inlet 26. A view of line 4-4 is from second end 16 toward first end 14.

As shown in FIGS. 2 and 3, inverse taper 25 may include an increasing diameter from a first end 14 of second portion 24 of housing 12 toward second end 16 of housing 12. Accordingly, inverse taper 25 may increase a volume of housing 12. Inverse taper 25 may include a starting point and begin at a longitudinal location on housing 12 beyond air inlet 26. Thus, air inlet 26 may be located on first portion 22 of housing 12 and inverse taper 25 may define second portion 24 of housing 12. Inverse taper 25 may be defined by an inverse taper angle 29 (as shown in FIG. 2) with respect to the central longitudinal axis 13 of housing 12. For example, inverse taper 25 may include an angle between 1-10 degrees. For clarity, angle 29 is shown with respect to a horizontal, longitudinal axis line that is parallel to central longitudinal axis 13 of housing 12.

Radial air cleaner 10 may also include an exhaust port 27 extending through housing 12. Exhaust port 27 may be located adjacent second end 16 of housing 12 and on an opposite side of housing 12 as air inlet 26. Exhaust port 27 may include a valve (not shown) or the like and may be configured to dispense or otherwise exhaust particulates from radial air cleaner 10, as detailed further below. The valve of exhaust port 27 may include a rubber-like material, as known in the art.

As further shown in FIGS. 2-4, radial air cleaner 10 includes a filter support member 34 for supporting a filter 36. Filter support member 34 may include a generally cylindrical shape and may be sized and configured to receive and support filter 36. In some embodiments, filter support member 34 may include an additional member (not shown) located within and concentric to filter support member 34. The additional member may also be generally cylindrical and may be sized and configured to receive and support filter 36. In this way, filter support member 34 may be considered to support filter 36 directly and/or filter 36 may be support by the additional member of filter support member 34. Filter support member 34 may be attached or otherwise supported by an interior surface of first end wall 18. Filter support member 34 may be integrally formed with the interior surface of first end wall 18 and/or may be attached by other means to the interior surface of first end wall 18. An outer diameter of filter support member 34 may be smaller than an interior diameter of housing 12 such that a space is defined between an interior surface of housing 12 and an exterior surface of filter support member 34. As shown in FIG. 2, filter support member 34 may include a length that extends from the interior surface of first end wall 18 towards the second end wall 20 of housing 12. The length of filter support member 34 may extend beyond air inlet 26 such that air travelling through air inlet 26 may contact, or otherwise impinge upon, the outer surface of filter support member 34, as detailed further below. Further, a portion of air inlet 26 may extend to filter support member 34 while the remaining portions of air inlet 26 may extend only to housing 12, as shown in FIG. 2.

Filter 36 may include a shape substantially similar to the shape of filter support member 34 (e.g., and/or of the additional member of filter support member 34). For example, filter 36 may include a generally cylindrical shape. Filter 36 may be sized to be received and supported by filter support member 34 (e.g., and/or by the additional member of filter support member 34). For example, filter 36 may be sized to be press fit, or similarly mounted, into filter support member 34 (e.g., and/or in the additional member of filter support member 34). When mounted in filter support member 34, filter 36 may extend from first end wall 18 to second end wall 20. Filter 36 may include a filter media for filtering particulates, such as dust, from the intake air. The filter media of filter 36 may include any filter media material known in the art, such as a pleated paper material or the like.

As further shown in FIGS. 2-4, radial air cleaner 10 may include an inlet ramp or vane 40. Inlet vane 40 may include a thin, radially-extending strip of material that is mounted on filter support member 34. The material of inlet vane 40 may be the same as housing 12. A height of inlet vane 40 may extend from filter support member 34 to an interior surface of housing 12. Accordingly, inlet vane 40 may be attached or otherwise coupled to filter support member 34 and the interior surface of housing 12. A first, proximal end 42 of inlet vane 40 may be attached, mounted, or otherwise connected, to the interior surface of first end wall 18. A second, distal end 44 of inlet vane 40 may include a free end such that second end 44 does not contact another surface. The second end 44 may be located at a longitudinal position distally beyond air inlet 26. Inlet vane 40 may include a length extending between the first, proximal end 42 and the second, distal end 44. For example, the length of inlet vane 40 may be in a range of 390-410 mm. Further, the inlet vane 40 may extend over an arc segment or portion of filter support member 34 in a helical shape. Inlet vane 40 may extend over the arc portion in a range of 125-155 degrees circumferentially around filter support member 34. Preferably, the inlet vane 40 may extend over an arc portion in a range of 146-149 degrees. Inlet vane 40 may extend at a helix angle 46 with respect to an axis in a radial direction (e.g., an axis perpendicular to the central longitudinal axis 13). For example, the helix angle 46 may be in a range of 24-28 degrees. A longitudinal distance between the first end 42 and the second end 44 of inlet vane 40 may be between 177-237 mm. Preferably, the longitudinal distance of inlet vane 40 is in a range of 184-229 mm. Also, as shown in FIG. 4, air inlet 26 may be located on a first hemispherical side of housing 12 and inlet vane 40 may be located on a second hemispherical side of housing 12 opposite the first hemispherical side. Thus, air inlet 26 may direct air onto filter support member 34 at an arc segment different than the arc segment around which inlet vane 40 extends.

INDUSTRIAL APPLICABILITY

The disclosed aspects of the inverse taper 25 and the inlet vane 40 may be employed in any radial air cleaner 10 for an internal combustion engine.

With reference to FIGS. 2-4, intake air may enter the interior of housing 12 of radial air cleaner through air inlet 26. The intake air may contain particulates, such as dust. The compressor of the internal combustion engine may provide a vacuum effect such that the intake air is sucked or otherwise forced through the air inlet 26 and is directed towards the air outlet 28. After the intake air passes through the air inlet 26, the intake air contacts the outer surface of filter support member 34. For example, the portion of air inlet 26 that extends towards filter support member 34 may guide the intake air onto and around filter support member 34. In this way, the filter support member 34 guides the intake air around a circumference of filter support member 34. The intake air then contacts and is guided by the distal side of the inlet vane 40. In this way, the inlet vane 40 pushes, or otherwise deflects, the intake air from the filter support member 34 towards the interior surface of housing 12. At the same time, the inlet vane 40 guides the intake air from the first, proximal end 14 of the housing 12 out in a direction towards second, distal end 16. Thus, inlet vane 40 generates a helical effect on the intake air around the interior surface of housing 12 and a centrifugal force of the intake air is generated. The intake air then swirls or otherwise spins and is guided around the interior surface of housing 12 towards second end 16. For example, the intake air is guided around the inverse taper 25 section of housing 12. Due to the centrifugal force of the intake air, particulates in the intake air may be pushed to the interior surface of housing 12. Accordingly, an initial amount of particulates may be deposited out of the interior of housing 12 through exhaust port 27 when the intake air reaches exhaust port 27. The intake air may then contact the interior surface of second end wall 20 and may be directed through filter 36. Filter 36 may filter any remaining particulates from the intake air and the intake air may then be directed out of housing 12 through air outlet 28. Thus, radial air cleaner 10 may include a two-stage radial air cleaner such that an initial amount of particulates are deposited out of housing 12 in a first stage, as described above, and any remaining particulates are filtered by filter 36.

The radial air cleaner 10 of the present disclosure may provide for an improved radial air cleaner. The inlet vane 40 generates a helical effect on the intake air toward the second end 16 and may increase velocity of the intake air through housing 12. Accordingly, the centrifugal force of intake air through housing 12 may be increased. Further, the inverse taper 25 prevents or otherwise minimizes an increased pressure due to the increase in velocity of the intake air. For example, any effects of increased pressure of the intake air due to the increase in velocity may be offset by the inverse taper 25 due to the expanding the volume of housing 12. Thus, radial air cleaner 10 provides for an increase in cleaning efficiency while having a minimal effect on the restriction in housing 12 to prevent creating additional pressure in housing 12.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An air cleaner for an internal combustion engine, comprising:
    a housing defining an interior and having a first end and a second end opposite the first end, the housing including:

an air inlet configured to be fluidly coupled to an air intake of the internal combustion engine;

an air outlet configured to be fluidly coupled to a compressor of the internal combustion engine;

a generally cylindrical shaped section extending from the first end; and an inverse taper section located distally from the generally cylindrical shaped section and extending towards the second end, wherein a diameter of the inverse taper section increases from a first end towards the second end, the inverse taper section at the second end forming a maximum inner diameter of an entirety of the housing.

2. The air cleaner of claim 1, wherein the inverse taper section includes an inverse taper angle with respect to a longitudinal axis of the housing.

3. The air cleaner of claim 2, wherein the inverse taper angle is in a range of 1-10 degrees.

4. The air cleaner of claim 1, wherein the inverse taper section begins at a longitudinal position on the housing distally beyond the air inlet.

5. The air cleaner of claim 4, wherein the inverse taper section extends to an end wall of the housing that defines the second end.

6. The air cleaner of claim 1, wherein the housing includes an exhaust port located adjacent the second end.

7. The air cleaner of claim 1, further including a filter support member configured to support a filter, the filter support member located in the interior of the housing.

8. The air cleaner of claim 7, further including an inlet vane located on the filter support member.

9. The air cleaner of claim 8, wherein the inlet vane extends in a helical shape around a circumference of the filter support member.

10. An air cleaner for an internal combustion engine, comprising:
a housing defining an interior and having a first end and a second end opposite the first end, the housing including:
an air inlet configured to be fluidly coupled to an air intake of the internal combustion engine, the air inlet being located on a first hemispherical side of the housing; and
an air outlet configured to be fluidly coupled to a compressor of the internal combustion engine;
a filter support member located in the interior of the housing at the first end, the filter support member configured to support a filter and defining a generally cylindrical shape; and
an inlet vane extending around a portion of a circumference of the filter support member, the inlet vane extending from the first end of the housing towards the second end of the housing, the inlet vane including a first end attached at the first end of the housing and a second, free end, the inlet vane being located on a second hemispherical side of the housing that is opposite the first hemispherical side.

11. The air cleaner of claim 10, wherein the inlet vane extends in a helical shape around the filter support member.

12. The air cleaner of claim 11, wherein a helix angle of the inlet vane is in a range of 24-28 degrees.

13. The air cleaner of claim 10, wherein a longitudinal distance between the first end and the second end of the inlet vane is in a range of 177-237 mm.

14. The air cleaner of claim 10, wherein a height of the inlet vane extends from the filter support member to an interior surface of the housing.

15. The air cleaner of claim 10, wherein the inlet vane extends over an arc portion of the filter support member, the arc portion being in a range of 125-155 degrees.

16. The air cleaner of claim 10, wherein the housing includes an inverse taper section defined by an increasing diameter from a first end towards the second end.

17. The air cleaner of claim 16, wherein the inverse taper section extends at an inverse taper angle in a range of 1-10 degrees with respect to a longitudinal axis of the housing.

18. An air cleaner for an internal combustion engine, comprising:
a housing defining an interior and having a first end and a second end opposite the first end, the housing including:
an air inlet configured to be fluidly coupled to an air intake of the internal combustion engine;
an air outlet configured to be fluidly coupled to a compressor of the internal combustion engine;
a generally cylindrical shaped section extending from the first end; and
an inverse taper section located distally from the generally cylindrical shaped section and extending towards the second end, wherein a diameter of the inverse taper section increases from a first end towards the second end such that the inverse taper section defines an increased volume of an entirety of the housing at a distal portion of the inverse taper section;
a filter support member located in the interior of the housing at the first end, the filter support member configured to support a filter and defining a generally cylindrical shape; and
an inlet vane extending in a helical shape around a portion of a circumference of the filter support member, the inlet vane extending from the first end of the housing towards the second end.

19. The air cleaner of claim 1, wherein the inverse taper section defines an area of increased volume of the housing that is present at a distal portion of the inverse taper section.

20. The air cleaner of claim 18, wherein the air inlet is located in a first hemispherical side of the housing, and the inlet vane is located in a second hemispherical side of the housing, the second hemispherical side being opposite the first hemispherical side.

* * * * *